United States Patent
Carpenter

[11] 3,775,082
[45] Nov. 27, 1973

[54] GLASS FORMING APPARATUS
[75] Inventor: Lynn A. Carpenter, State College, Pa.
[73] Assignee: Corning Glass Works, Corning, N.Y.
[22] Filed: Apr. 13, 1972
[21] Appl. No.: 243,803

[52] U.S. Cl............................ 65/162, 65/307, 65/319
[51] Int. Cl................................................ C03b 11/02
[58] Field of Search.................... 65/306, 307, 319, 65/162

[56] References Cited
UNITED STATES PATENTS
| | | | |
|---|---|---|---|
| 3,138,241 | 6/1964 | Dahlman | 65/319 X |
| 3,558,298 | 1/1971 | Carmi et al. | 65/319 X |
| 3,598,559 | 8/1971 | Johnston et al. | 65/319 X |

*Primary Examiner*—Robert L. Lindsay, Jr.
*Attorney*—Clarence R. Patty, Jr. et al.

[57] ABSTRACT

Apparatus for forming glass articles each having a generally upright wall, such as, for example, skirted glass viewing panels for television picture tubes and particularly including a novel type of ring mold cooperative with a female main mold member to define a mold cavity for forming the articles or panels. The ring mold embodies passages through which vacuum is supplied to the upright wall of an article such as the skirted portion of a panel formed in the mold cavity to support the upright wall or skirted portion until the glass of the article or panel has cooled sufficiently for the upright wall or skirted portion of the formed article or panel to be self-supporting. Means are disclosed for providing vacuum to the passages in the ring mold at a selected time or times following the forming of the article or viewing panel.

5 Claims, 6 Drawing Figures

GLASS FORMING APPARATUS

BACKGROUND OF THE INVENTION

For obvious economic reasons it is expedient in mass production manufacturing operations to make parts at as high a rate of speed as practicable or possible with a single set of manufacturing apparatus. Accordingly, it is desirable to form glass parts such as viewing panels for television picture tubes in accordance with the same criteria. However, in glass forming operations it is necessary, following the forming of each glass part, to support each such part until the glass thereof has cooled or become sufficiently set up for the respective glass part to be self-supporting. This can be done by maintaining the forming apparatus, such as a pressing plunger, in contact with a glass part for a cooling period following the forming of such part. However, this delays the use of the forming apparatus or plunger for forming a subsequent part and reduces the output of such apparatus per unit of time.

In the press forming of a skirted viewing panel for a television picture tube, for example, the skirted portion of such panel, immediately following the forming thereof, is not self-supporting and the rim or brim of such portion tends to sag inwardly towards the center of the panel if the forming plunger is extracted therefrom at too early a time following the press forming of the panel by the plunger. Therefore, in order to free such plunger for a succeeding press forming operation at an early time following each preceding forming operation, ring molds used in the press forming operations of the type discussed have each heretofore been provided with a depending lip behind which the rims of the skirted portions of the viewing panels are formed. The depending inner surface of such lips are in contact with the inner edges of said rims following the forming thereof and, thereby, prevent the rims and the part of the skirts adjacent thereto or therebelow from sagging inwardly towards the centers of the respective panels following the forming of such panels and the removal of the pressing plunger from each of the panels. However, said depending lips form a step or recess in the inner edge of the rim or brim of the skirt portion of each skirted viewing panel. Such a step or recess has no utility in itself and it narrows the width of the sealing edge of each respective viewing panel if such edge is not ground down to the base of the recess or step. For this and other various reasons it has been considered expedient or desirable to eliminate said steps or recesses by eliminating said depending lips which cause the forming thereof. Accordingly, the novel ring mold and the associated apparatus of the present invention was developed.

SUMMARY OF THE INVENTION

The invention disclosed is considered to be sufficiently summarized in the preceding abstract of the disclosure and, therefore, in order to prevent redundancy and attain brevity to the extent possible, no further summarization or description of the invention will be given as it is not considered necessary.

BRIEF DESCRIPTION OF THE DRAWINGS

In the drawings:

FIG. 3 is an elevational cross-sectional view of the ring mold and associated apparatus of FIG. 2, such view being taken generally along line 3—3 of FIG. 2 and further including in substantially schematic form a control apparatus embodied in the present invention;

FIG. 4 is a cross-sectional view of the ring mold of FIGS. 2 and 3, such view being taken generally along line 4—4 of FIG. 3;

FIG. 5 is an enlarged elevational view illustrating the details of a plug forming a part of the ring mold of the invention; and FIG. 5a is an end view of the ring mold part or plug of FIG. 5, such view being taken generally along line 5a—5a of FIG. 5.

Similar reference characters refer to similar parts in each of the figures of the drawings.

PREFERRED EMBODIMENT OF THE INVENTION

Figure 1:
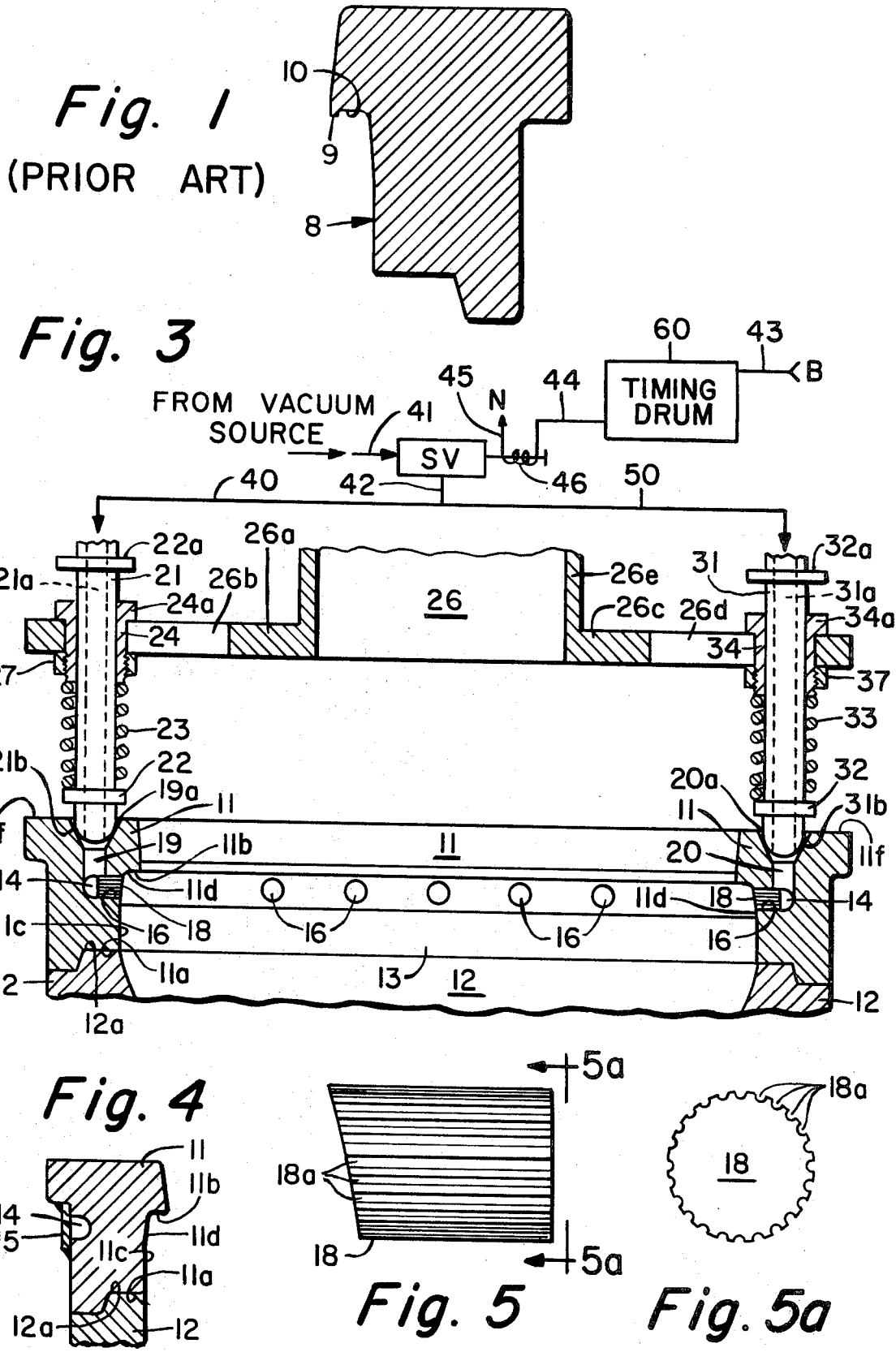
FIG. 1 is a cross-sectional view in elevation of a ring mold illustrating the prior art incorporating a depending lip such as previously discussed and hereinafter further mentioned.

Referring to the drawings in detail, there is shown in FIG. 1 a cross section of a ring mold 8 of the prior art and incorporating a lip 9 such as previously discussed and which depends from a forming surface 10 of mold 8, such surface being the type of forming surface previously provided in a ring mold for forming the sealing edges of viewing panels formed in a mold cavity partially defined by the ring mold such as 8. As will become apparent hereinafter, the necessity for the depending lip 9 of a ring mold such as 8 is eliminated by the ring mold and associated apparatus of the present invention.

Figure 2:
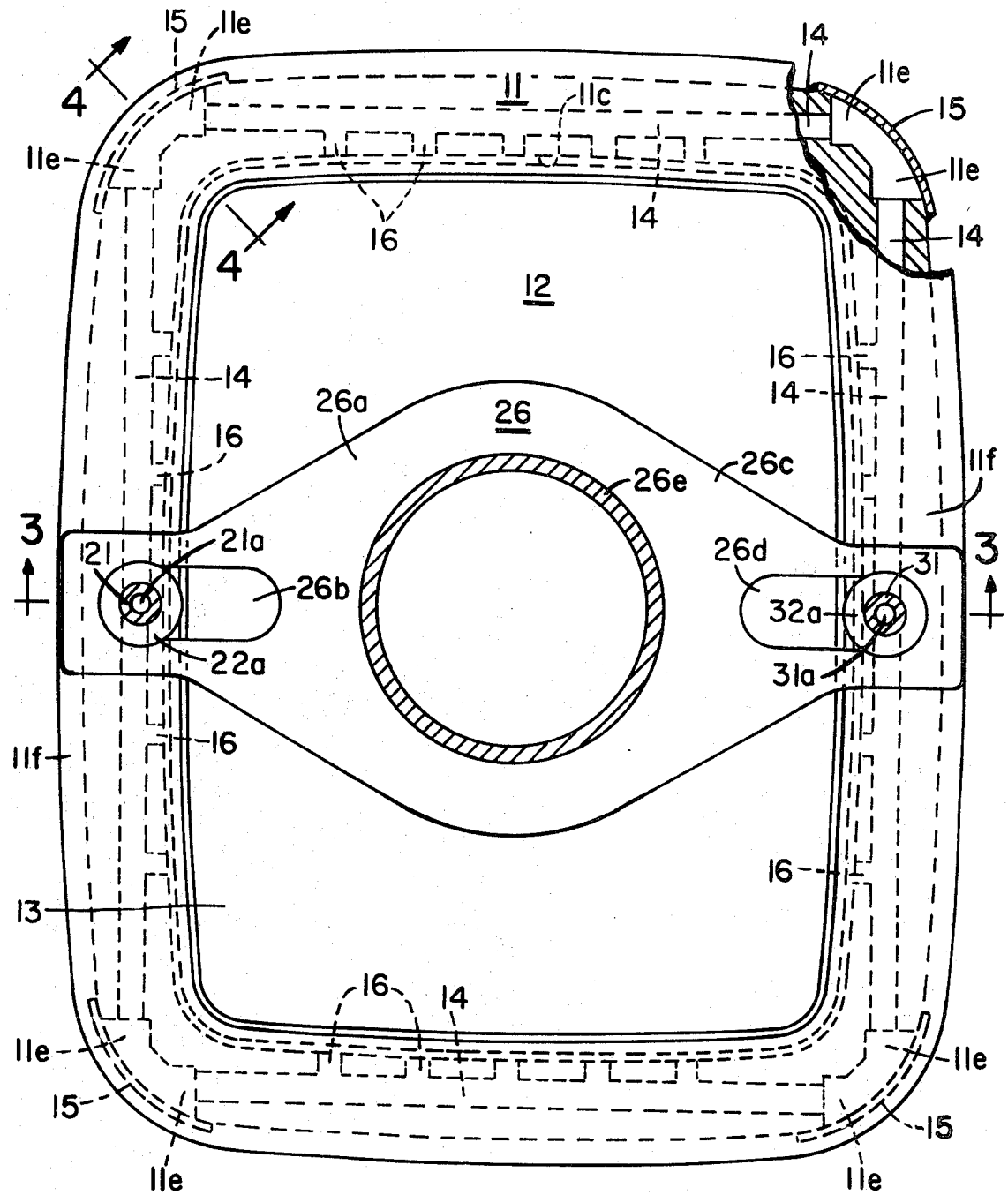
FIG. 2 comprises a top plan view of a ring mold and associated apparatus embodying the invention.

Referring now to FIGS. 2, 3 and 4, there is shown a ring mold or somewhat rectangular annular mold member 11 which is cooperative with a female mold member 12 to form a mold cavity 13 (FIG. 3) for the press forming therein of skirted viewing panels for television picture tubes. As illustrated in FIGS. 3 and 4, the lower annular surface 11a of ring mold or mold member 11 is shaped to complementarily fit against the upper annular surface 12a of main mold 12, the lower portion of such main mold being broken away in FIGS. 3 and 4 for purposes of simplification of the drawings. However, the arrangement will be readily apparent to those skilled in the art. It is pointed out that ring mold or member 11 includes a viewing panel sealing edge forming surface 11b which corresponds to the forming surface 10 of the ring mold 8 of FIG. 1 but does not include a depending lip such as 9 provided on ring mold 8.

Ring mold or annular mold member 11 also embodies an inner annular glass forming surface 11c which has a contour or is shaped to form the outer peripheral surface of a skirted portion of a skirted viewing panel as will also be readily apparent to those skilled in the art. Surface 11c includes an upper portion 11d which borders said sealing edge forming surface 11b as shown in FIG. 3. The ring mold or mold member 11 also embodies within the walls of such mold or member, and preferably behind portion 11d of forming surface 11c, a main passage 14 which preferably, but not necessarily, extends completely and annularly for the full extent or annular distance of forming surface 11c and its said portion 11d. As illustrated in the upper right hand corner of ring mold 11 (viewing FIG. 2) and as also shown in FIG. 4, the passage 14 is extended around the rounded corners of ring mold or annular mold member 11 by cutting recesses (FIG. 2) such as 11e in such ring mold or mold member adjacent said rounded corners and then covering and hermetically sealing such recesses by curved metal strips such as 15 which may, for example, be welded to the outer periphery of ring mold or annular member 11 adjacent the recesses such as 11e and as illustrated in FIGS. 2 and 4. This arrangement is readily apparent from brief glances at FIGS. 2 and 4.

A plurality of branch passages such as 16 are also embodied within the walls of annular mold member or ring mold 11 and first ends of such passages extend to said main passage 14. The second ends of the branch passages such as 16 extend to portion 11d of forming surface 11c. A generally cylindrical plug such as 18, and embodying on its outer peripheral surface a plurality of parallel flutes, channels or grooves such as 18a which extend the full length of the plug, is press fitted in each passage such as 16 as illustrated in FIG. 3. Thus, each passage such as 16 connects main passage 14 with mold cavity 13 through a myriad of relatively minute orifices comprising the ends of the flutes or grooves such as 18a opening through surface portion 11d of forming surface 11c. The fluted, channeled or grooved plugs such as 18 and their embodied flutes, grooves or channels such as 18a are shown in detail in FIGS. 5 and 5a of the drawings. For purposes of simplification of the drawings, only two passages such as 16 are shown in FIG. 3 as being provided with the fluted plugs such as 18. However, it will be readily understood that all of the passages such as 16 are, in practice, provided with press-fitted plugs such as 18. It is also pointed out that the plugs such as 18, at the ends thereof adjoining said forming surface portion 11d, are provided at such ends with a contour or shape corresponding to that of such forming surface portion. This will also be readily apparent to those skilled in the art.

A pair of vacuum supply passages 19 and 20 (FIG. 3), are also embodied within the walls of mold ring or annular mold member 11, and connect at their lower ends with main passage 14 in ring mold or member 11. The upper ends of passages 19 and 20 flare outwardly to provide funnel shaped portions 19a and 20a, respectively, which open to the exterior of ring mold 11 through upper surface 11f thereof. Vacuum is periodically connected to said passages 19 and 20 by apparatus discussed below, and at selected times and for a purpose also discussed below.

As illustrated in FIGS. 2 and 3, there is provided a first tubular assembly including a first vertical tubular member 21 embodying a passage 21a which extends longitudinally through the member and opens out through a semispherical lower end 21b of the tubular member 21. A collar 22 is secured to the outer periphery of member 21 near the lower end 21b of such member, and a compressible spring 23 surrounds member 21 above collar 22 with the lower end of the spring bearing against the upper surface of such collar. The upper end of member 21 extends snugly but slidably through a sleeve 24 which includes an upper flange portion 24a. Sleeve 24 is disposed in and extends downwardly through a snugly fitting slot 26b embodied in a first horizontally extending arm 26a of a support and actuating member 26 to be discussed in more detail hereinafter.

The lower surface of the flange portion 24a of sleeve 24 rests on the portions of the upper surface of arm 26a which border said slot 26b. The lower end of sleeve 24 is threaded and a cooperatively threaded nut 27 is screwed onto the lower end of sleeve 24 until the upper surface of the nut contacts the portions of the lower surface of arm 26a bordering slot 26b. By such arrangement sleeve 24 may be slidably moved or adjusted within slot 26b to a selected or desired position and nut 27 then tightened on such sleeve to hold sleeve 24 in said desired or selected position. The lower end of sleeve 24 bears against the upper end of the aforesaid spring 23 and, therefore, when the aforesaid tubular member 21 is moved upwardly as by an upward force applied against the semispherical lower end of the tubular member, such member moves within sleeve 24 and spring 23 is compressed between the aforesaid collar 22 and the lower end of sleeve 24 as is readily apparent. A second collar 22a is secured to the outer periphery of tubular member 21 above and spaced from the upper surface of flange portion 24a of flange 24. Such collar 23a limits the downward movement of tubular member 21 within sleeve 24 as is readily apparent. For purposes of simplification of the drawings, the extreme upper end of tubular member 21 is not shown in the drawings but it will be understood that such end is hermetically connected to one end of a flexible conduit whose second end is hermetically connected to a suitable fluid flow control valve SV to be hereinafter discussed. The flexible conduit is schematically represented in the drawings by a single line designated 40. This will be further discussed hereinafter.

The aforesaid support and actuating member 26 includes a second horizontally extending arm 26c which is a mirror image of the aforesaid arm 26a and which embodies a slot 26d, the horizontal longitudinal centerlines of such arm and slot being in alignment with the horizontal longitudinal centerlines of the aforesaid arm 26a and slot 26b. Arms 26a and 26b are aligned diametrically opposite each other on first and second sides of the center of vertically extending cylindrical main portion 26e of the aforesaid support and activating member 26. Arm 26c and slot 26d are provided with a tubular member assembly which is identical to that described for arm 26a and its slot 26b and, therefore, reference characters 31, 31a, 31b, 32, 32a, 33, 34, 34a and 37 designate parts etc. which correspond respectively to parts 21, 21a, 21b, 22, 22a, 23, 24, 24a and 27 of the tubular member assembly previously described. No detailed description of the tubular member assembly provided in slot 26d of arm 26c is, therefore, considered necessary except to point out that the extreme upper end of tubular member 31 is also omitted from the drawings but it will be understood that such end is hermetically connected to one end of a flexible conduit whose second end is also hermetically connected to the previously mentioned fluid flow control valve SV which is a control valve that is normally spring biased to a closed position and is actuated to an open position or condition upon the energization of a control or solenoid winding 46 of the valve. The flexible conduit connected to tubular member 31 is schematically represented in the drawings by a single line designated 50.

In employing mold assemblies each comprising a ring mold and an associated female main mold member such as shown and discussed herein, a plurality of such assemblies may, for example, be supported adjacent the outer periphery of the table of a turret-type glass-pressing machine which periodically moves said assemblies in a stepwise manner through a plurality of work stations including a press-forming station, one or more cooling stations following the press-forming station, and finally to an article takeout station. Such a machine is shown, for example, in U.S. Pat. No. 3,138,241 issued June 23, 1964 to Frederick A. Dahlman. As previously mentioned, it is economically expedient in forming glass parts, as in any mass production operation, to form such parts at as high a rate of speed as practicable with a single set of manufacturing apparatus or a single glass-forming machine such as that of said Dahlman patent. However, as also previously mentioned, in glass-forming operations, means must be provided for supporting portions of some types of newly formed glass articles until such glass portions have sufficiently cooled to become self-supporting. As also previously discussed, the novel ring mold and associated apparatus of the present invention was developed for providing support for generally upright walls of glass articles, such as the skirt portions of skirted viewing panels for television picture tubes, immediately following the forming of such articles or viewing panels, and, when the ring molds of the present invention are used on a machine such as that shown in the aforecited Dahlman patent, a set of vacuum supply apparatus such as that shown in FIG. 3 of the drawings is provided at each of one or more of the stations following the press forming station.

Returning now to FIG. 3 of the drawings, taken in conjunction with FIG. 2, the aforementioned support and actuating member 26 of each set of vacuum supply apparatus provided is actuated sequentially up and down in time relationships with the intermittent stepping movement, to each respective one of said stations, of the mold assemblies including the ring molds of the invention. Such time relationships are under the control of the usual timing drum used in controlling the intermittent stepping rotations of the table of the previously mentioned glass forming machine carrying said mold assemblies. Such timing drum is shown in FIG. 3 and is designated by the reference character 60. Each support and actuating member such as 26 may, for example, be actuated in the same manner as the press-forming plunger of the glass-forming machine, that is, by a suitable so-called ram, or the piston rod of a pressurized-fluid motor including a cylinder and associated piston attached to such piston rod. This will be readily recognized by those skilled in the art.

Vacuum is supplied through the passages in said tubular members 21 and 31, and to the respective lower ends 21b and 31b of such members, from a suitable source of vacuum which is not shown in the drawings for purposes of simplification thereof. However, it is indicated in FIG. 3 that said source is connected over a conduit 41 to the input port of electrical solenoid activated valve SV including control winding 46 which is energized over said timing drum 60 as discussed in more detail hereinafter. The output port of solenoid valve SV is connected over a conduit 42 to the previously mentioned second ends of flexible conduits 40 and 50 whose second ends hermetically connect to said tubular members 21 and 31, respectively. A source of direct electrical current having a voltage and capacity suitable for the operation of one or more solenoid valves such as SV is provided but such source is not shown in the drawings for purposes of simplification thereof. However, the positive and negative terminals of said source are designated B and N, respectively. Terminal B of said current source is connected over a conductor 43 to timing drum 60 and a second conductor 44 extends from said timing drum to one end of the control winding 46 of solenoid valve SV. The other end of such control winding is connected over a conductor 45 to said terminal N of the current source. It will be readily understood by those skilled in the art that conductors 43 and 44 are, at times, hereinafter described, connected with each other by suitable electrical circuit controlling contacts provided in timing drum 60 as is well known.

OPERATIONAL EXAMPLE OF THE INVENTION

In a glass forming operation using a press-forming machine, such as that of the previously cited patent to Dahlman, and ring molds and associated apparatus such as that herein disclosed, each such ring mold and its cooperative female mold member is intermittently positioned at a first station following the glass-pressing station at the same time that a succeeding ring mold and its cooperative mold member is positioned at said pressing station for the press forming of a molten glass gob at such station. Accordingly, a set of vacuum supply apparatus is provided at said first station and, when the pressing plunger is actuated downwardly under the control of timing drum 60, the support and actuating member 26 of said set of apparatus provided at said first station is also actuated downwardly. It will be understood that support and actuating member 26 is positioned at said station so that tubular members 21 and 31 are in vertical alignment with the upper ends 19a and 20a of vacuum supply passages 19 and 20, respectively, provided in each ring mold 11 when positioned at said first station and, therefore, said member 26 moves tubular members 21 and 31 towards said passages until they enter such passages and the lower semispherical ends 21b and 31b of the tubular members seated in said upper ends 19a and 20a of passages 19 and 20, respectively. Further downward actuation of member 26 causes compression of springs 23 and 33 and it is thereby assured that said semispherical ends are firmly sealed without undue shock being applied to said tubular members or to ring mold 11.

Following the seating of said lower ends of tubular members 21 and 31 as discussed above, timing drum 60 closes its set of electrical circuit controlling contacts connected to aforesaid conductors 43 and 44, and an electrical circuit is thereby completed from terminal B of the current source, through said electrical contacts and through said control winding 46 to terminal N of the current source. Solenoid valve SV is thereby actuated, against the force of its spring biasing feature, to connect said vacuum source through such valve to conduit 42 and thence through conduits 40 and 50 to the upper ends of tubular members 21 and 31, respectively, and thence to the lower ends of such members. The source of vacuum is thus connected to passages 19 and 20 and to main passage 14 embodied in ring mold 11, and thence supplied, through the previously mentioned flutes or channels such as 18a in the plug members such as 18 provided in the passages such as 16, to the part of the skirted portion of the newly formed viewing panel in ring mold 11 which borders on the sealing edge of such skirted portion of the panel. Such vacuum holds or causes said skirted portion of the newly formed panel to be held by suction against the forming surface 11c of ring mold 11 and prevents such skirt portion from sagging inwardly towards the center of the panel.

When the molten glass gob then in the mold assembly at the press-forming station has been formed so that the pressing plunger is to be withdrawn from the formed viewing panel, timing drum 60 activates control apparatus to actuate such plunger in an upward direction as is well known in the art. Substantially simultaneously therewith, member 26 is also actuated upwardly under the control of the timing drum while such timing drum also opens the previously discussed set of electrical contacts to interrupt the energizing circuit for the control winding 46 of solenoid valve SV. The previously mentioned spring biasing feature of such valve then rapidly returns the valve to its normal closed position and the vacuum supply to ring mold 11 is thereby terminated.

As previously mentioned, a set of vacuum supply control apparatus such as that discussed above can be provided at additional stations following the first station after the press-forming station if it is considered or found to be necessary for the support of the skirted portions of the formed viewing panels when such panels are at such stations. In such event additional circuit controlling contacts in timing drum 60 can be provided or the solenoid valves such as SV, associated with each set of vacuum supply control apparatus, can all be controlled over the same set of contacts in timing drum 60 to supply the vacuum desired. Furthermore, if a large enough solenoid valve SV is provided and a suitable size of vacuum supply conduits 41 and 42 are also provided, vacuum can be supplied to all the sets of vacuum supply control apparatus in multiple from solenoid valve SV.

It is pointed out that the set of vacuum supply apparatus shown in FIGS. 2 and 3 is illustrated as being adjusted for the size of a ring mold and associated main mold used in the forming of viewing panels of a maximum size. However, the set of vacuum supply apparatus shown can be used with smaller size ring molds simply by correspondingly adjusting the positions of the tubular members 21 and 31 supported on arms 26a and 26c of support and activating member 26. As is believed obvious, such adjustments are made by loosening nuts 27 and 37 (FIG. 3) and sliding sleeves 24 and 34 to their new positions. Such nuts are then again tightened to hold the tubular members in their new positions.

Although there is herein shown and described only one form of apparatus embodying the invention, it is to be understood that such is not to be considered in any way limiting but that various changes can be made in the invention within the purview of the appended claims without departing from the spirit and scope thereof.

I claim:

1. In a glass-forming machine including a mold carrying rotatable table for intermittently moving each of a plurality of supports for forming molds through a circular path of travel and sequentially to each of a series of stations located in said path and including a press-forming station, one or more cooling stations, and a formed article takeout station, apparatus for aiding in maintaining the configuration of press-formed glass articles subsequent to the forming thereof at said press-forming station, each such article having a generally upright wall, said apparatus comprising, in combination;
   A. a composite mold for each said mold support each such mold including a female main mold member and a ring mold comprising an annular member embodying,
      I. a lower annular surface shaped to complementarily fit against the upper surface of said main mold member to define therewith a mold cavity for forming one of said glass articles,
      II. an inner annular glass forming surface shaped to form the outer surface of said generally upright wall of said glass article,
      III. a main passage embodied within the walls of said annular member and behind said forming surface such passage extending for at least a substantial part of the annular extent of such forming surface,
      IV. a plurality of branch passages embodied within the walls of said annular member and connecting said main passage with a myriad of relatively minute orifices opening through said forming surface, and
      V. a vacuum supply passage embodied within the walls of said annular member and connecting said main passage with an orifice opening through an exterior surface of the annular member for periodic connection with a source of vacuum;
   B. a vacuum supply means associated with a selected cooling station in said circular path of travel, such means actuated for supplying vacuum to said vacuum supply passages of the annular member of the respective ring mold of each said composite mold moved to such cooling station; and
   C. means for actuating said vacuum supply means to at times connect with said vacuum supply passages and to then supply vacuum to such passages, such actuating means operating in time relationships with the movement of each said composite mold to and from said selected cooling station.

2. Apparatus in accordance with claim 1 and further including vacuum supply means associated with one or more of said cooling stations in addition to said selected cooling station in said circular path of travel and actuating means associated with each said vacuum supply means.

3. Apparatus in accordance with claim 1 and in which said actuating means are operated in said time relationships by a timing drum associated with and used for controlling the intermittent movements of said glass forming machine.

4. Apparatus in accordance with claim 2 and in which said actuating means are operated in said time relationships by a timing drum associated with and used for controlling the intermittent movements of said glass forming machine.

5. A ring mold cooperative with a female main mold member to provide a composite mold for the forming of glass articles each having a generally upright wall, such ring mold comprising an annular member embodying;
   I. a lower annular surface shaped to complementarily fit against the upper surface of said main mold member to define therewith a mold cavity for forming one of said glass articles;

II. an inner annular glass forming surface shaped to form the exterior surface of the upright wall of said glass article,
III. a main passage embodied within the walls of said annular member and behind said forming surface such passage extending for at least a substantial part of the annular extent of such forming surface,
IV. a plurality of branch passages embodied within the walls of said annular member and connecting said main passage with a myriad of relatively minute orifices opening through said forming surface, and
V. a vacuum supply passage embodied within the walls of said annular member and connecting said main passage with an orifice opening through an exterior surface of the annular member for periodic connection with a source of vacuum, whereby
VI. vacuum can be supplied through said passages to said exterior surface of the upright wall of the glass article formed in said mold cavity to hold such surface against said inner annular glass forming surface until the glass of the glass article has cooled sufficiently for the upright wall thereof to be self-supporting.

* * * * *